(12) United States Patent
Kuehne

(10) Patent No.: US 12,716,989 B2
(45) Date of Patent: Aug. 25, 2026

(54) METHOD OF TIME DIFFERENCE OF ARRIVAL LOCATING AS WELL AS LOCATING SYSTEM

(71) Applicant: Rohde & Schwarz GmbH & Co. KG, Munich (DE)

(72) Inventor: Jens Kuehne, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 375 days.

(21) Appl. No.: 18/454,229

(22) Filed: Aug. 23, 2023

(65) Prior Publication Data

US 2024/0111016 A1 Apr. 4, 2024

(30) Foreign Application Priority Data

Oct. 4, 2022 (EP) .................................... 22199564

(51) Int. Cl.
*H04W 64/00* (2009.01)
*G01S 5/06* (2006.01)

(52) U.S. Cl.
CPC ............. *G01S 5/06* (2013.01); *H04W 64/003* (2013.01)

(58) Field of Classification Search
CPC ....... H04W 24/10; H04W 4/02; H04W 4/021; H04W 4/023; H04W 4/027; H04W 4/029; H04W 4/12; H04W 52/243; H04W 52/325; H04W 52/42; H04W 64/00; H04W 72/0446; H04W 72/23; H04W 8/005
See application file for complete search history.

(56) References Cited

U.S. PATENT DOCUMENTS 8,098,200 B1 * 1/2012 Gines .................... G01S 5/0278 342/465
10,663,557 B2 * 5/2020 Lemer ..................... G06F 17/18
2008/0186235 A1 8/2008 Struckman et al.
2015/0323934 A1 * 11/2015 Lin ...................... G05D 1/0276 701/26
2016/0054425 A1 * 2/2016 Katz ......................... G01S 3/14 342/417
2016/0299212 A1 10/2016 Broad
2016/0370453 A1 * 12/2016 Boker ................... G01S 5/0218
2019/0297412 A1 * 9/2019 Hentunen ............ G10K 11/175
2021/0152978 A1 5/2021 Peyrotte et al.

FOREIGN PATENT DOCUMENTS

DE 102012006784 A1 10/2013

* cited by examiner

*Primary Examiner* — Quan M Hua
(74) *Attorney, Agent, or Firm* — CHRISTENSEN O'CONNOR JOHNSON KINDNESS PLLC

(57) ABSTRACT

Embodiments of the present disclosure relate to a method of Time Difference of Arrival (TDoA) locating an emitter that emits a signal by a mobile receiver. A first measurement of the signal is performed at a first location, thereby obtaining first measurement results. A second measurement of the signal is performed at a second location, thereby obtaining second measurement results. A third measurement of the signal is performed at a third location, thereby obtaining third measurement results. The first measurement results, the second measurement results and the third measurement results are processed, thereby determining the location of the emitter. At least one of the second location and the third location is determined based on a reception range. Further, a locating system is described.

19 Claims, 1 Drawing Sheet

METHOD OF TIME DIFFERENCE OF ARRIVAL LOCATING AS WELL AS LOCATING SYSTEM

FIELD OF THE DISCLOSURE

Embodiments of the present disclosure relate to a method of time difference of arrival (TDoA) locating an emitter that emits a signal by a mobile receiver. Further, embodiments of the present disclosure relate to a locating system for time difference of arrival (TDoA) locating an emitter that emits a signal.

BACKGROUND

In the state of the art, different techniques and approaches are known that are used for locating an emitter.

In two-dimensional scenarios, it is known to use several receivers in order to determine the location of an emitter of a signal. For instance, cross bearing techniques are applied while using two stationary direction finders, wherein the respective locations of the stationary direction finders have to be known such that the signals received by the stationary direction finders can be used to determine the location of the emitter.

Further, it is also known to use receivers that are synchronized in time, namely so called time-synchronous receivers. The receivers each receive a signal emitted from the emitter to be located, wherein signal runtimes are determined based on the signals received. The respective runtimes determined are evaluated further in order to determine the location of the emitter of the signal. The signal runtimes are used to determine the time difference of arrival which is the difference between time of arrivals (TOAs) at the respective locations of the receivers.

Typically, three receivers are used in two-dimensional scenarios, for example when TDoA techniques are used for locating the emitter. The respective receivers are positioned at different locations in order to perform the time difference of arrival (TDoA) locating of the emitter that emits the signal. Typically, these receivers are positioned stationary, which however causes disadvantages with regard to the flexibility. Using two receivers would result in an infinite number of possible locations, satisfying the measured time-difference of arrival, all of which are located on a hyperbola ($x^2/a^2-y^2/b^2=1$), as described in Roberts, R. (2004), TDOA Localization Techniques, the disclosure of which is incorporated by reference in its entirety.

When using mobile receivers, high efforts and high costs related thereto are required in order to synchronize the respective mobile receivers to ensure proper operation of the entire locating system.

Consequently, the respective techniques and approaches known in the state of the art lack flexibility or require high efforts, thereby causing high costs.

Accordingly, there is a need for locating an emitter in a cost-efficient manner while ensuring high flexibility.

SUMMARY

Embodiments of the present disclosure provide a method of time difference of arrival (TDoA) locating an emitter that emits a signal by a mobile receiver. The signal emitted by the emitter has at least one periodic signal portion. In an embodiment, the method comprises the steps of: performing a first measurement of the signal at a first location, thereby obtaining first measurement results, moving the receiver to a second location, performing a second measurement of the signal at the second location, thereby obtaining second measurement results, moving the receiver to a third location, performing a third measurement of the signal at the third location, thereby obtaining a third measurement results, and processing the first measurement results, the second measurement results and the third measurement results, thereby determining the location of the emitter. In some embodiments, the second location and/or the third location are/is determined based on a reception range.

The main idea is to locate the emitter of the signal by a single receiver that is moved along a certain route that comprises the first location, the second location as well as the third location. Hence, the required hardware is reduced significantly since only a single receiver is required rather than three receivers. In addition, the flexibility when locating the emitter can be ensured due to the fact that the receiver is a mobile one. In addition, the costs are reduced compared to locating systems using several mobile receivers that are synchronized in time due to the reduced hardware and the reduced efforts required to synchronize the receivers in time.

The single mobile receiver is moved along the route to reach the different locations at which the different measurements are performed. The respective reception range based on which the second location and/or the third location is determined corresponds to the reception range of the emitter. Thus, it is assumed that the different locations, at which the measurements shall be performed, are still within the reception range of the emitter such that the signal emitted by the emitter can be received by the receiver at the respective locations, namely the second location and the third location.

Since the emitter may be unknown, the respective reception range may be presumed. The respective presumption may be based on the signal received at the first location. In other words, the receiver may analyze the signal received at the first location, thereby gathering information concerning the signal, which is used to calculate a presumed reception range of the emitter. Then, this presumed reception range is used to determine the second location and/or the third location to be used for the subsequent measurements.

Accordingly, the measurement results are obtained at different times and at different locations, wherein the measurement results encompass information concerning the at least one periodic signal portion. The signals received at the different locations and at the different times can be compared with each other, e.g. due to the information gathered at the different locations and at different times, which is derived from the periodicity of the signal, namely the at least one periodic signal portion. In other words, the signals received at the different location at different times can be put in relation to each other, thereby assuming the location of the emitter. This may be done, for example, by a processor circuit or the like that can be part of the receiver or associated with the receiver, e.g. located on a same platform that also comprises the receiver.

The measurement results gathered at the different locations are used to determine the Time Differences of Arrival (TDoA) between the different locations.

The signal emitted by the emitter, propagating at a constant speed, arrives at the different locations at different absolute times, as the locations are at different distances from the location of the emitter. When referring to the periodic signal portion included in the signal and/or by using an internal clock of the receiver, the respective time differences of the arrival at the different locations can be determined. Furthermore, the geographical coordinates of the locations at which the respective measurements are done are known. Based thereon, the location of the emitter can be calculated, for example from the time differences determined at the different locations.

In some embodiments, the relative difference of the signal arrival time at two locations, namely the TDoA between two locations, is determined by known mathematical correlation procedures. This determined value and the geographical coordinates of the locations provide the basis for the calculations of all possible matching locations of the emitter. Transferred to a two-dimensional scenario, e.g. a map, the possible matching locations of the emitter would lie on a hyperbola due to the periodic signal portion of the signal. This can be calculated for both locations involved in the TDoA calculation, e.g. the first location and the second location. Hence, two different hyperbolas may be obtained. The different hyperbolas obtained intersect with each other in a point that corresponds to the location of the emitter, namely the geo-location of the emitter.

Furthermore, the respective calculations, e.g. the possible matching locations of the emitter which lie on a hyperbola as seen from one location, may be repeated for a second pair of locations, namely the second location and the third location. The hyperbola associated with the second location may be re-determined, for example determined in a more precise manner, as two different data sets are involved.

Three different hyperbolas associated with the three different locations are obtained due to the calculations performed.

The hyperbolas calculated may be mapped on a two-dimensional scenario, e.g. a map, such that the hyperbolas intersect each other. The intersection(s) of the hyperbolas calculated is the location of the emitter.

Generally, the periodic signal portion may relate to a start time aligned with a predictable time pattern or a preamble used in the signal. In some embodiments, the entire signal is a periodic signal.

In some embodiments, the emitter may emit signals continuously, for example at different times and towards different directions, such that the signal received at the different locations may relate to signals transmitted at different times.

Accordingly, a first signal is received at the first location at a first time, a second signal is received at the second location at a second time, and a third signal is received at the third location at a third time. However, the first signal, the second signal and the third signal correspond to each other, as these signals are emitted by the same emitter, but at different times.

Furthermore, the receiver may be moved in the air, over sea or at land, which generally depends on the respective kind of receiver used for locating the emitter.

In some embodiments, an automatically controlled flying platform, for instance an unmanned aerial vehicle (UAV), can be used for locating the emitter. In some embodiments, the flying platform comprising the receiver can be moved within the space freely such that any shadowing effects can be neglected compared to using a platform that is moved at land, e.g. a land-based platform.

In some embodiments, it is assumed that the location of the emitter is stationary while determining the location of the emitter. This assumption simplifies the calculation of the possible matching locations of the emitter, namely the ones lying on the respective hyperbolas.

An aspect provides that a route including the first location, the second location and the third location is, for example, dynamically determined, for example in an automatic manner. The receiver or a platform having the receiver may comprise a processor circuit that is enabled to perform the respective determination of the route which includes the locations at which the respective measurements shall be performed. The same processor circuit may also be used for evaluating the different measurement results obtained. Therefore, the receiver or the platform to which the receiver is disposed can automatically determine how to reach different locations at which the different measurements shall be performed. This ensures that the location of the emitter can be determined in an efficient manner.

Another aspect provides that the receiver, for example, automatically moves to the second location and/or to the third location. Therefore, an automatic locating of the emitter can be performed, as no manual input is necessary in order to determine the respective route and/or to reach the different locations at which the different measurements shall be performed, based on which results the location of the emitter is determined.

In some embodiments, the receiver, for example the associated processor circuit, determines the (presumed) reception range based on the first measurement results. Then, the second location and/or the third location are/is determined based on the (presumed) reception range, thereby ensuring that the second location and/or the third location are/is still within the (presumed) reception range. Further, the receiver, for example the associated processor circuit, automatically determines the route used to reach the different locations determined, namely the second location and the third location. Then, the receiver automatically moves along the route while automatically performing the respective measurements at the locations determined, namely the second location and the third location.

Based on the measurement results obtained at the different locations, the receiver, for example the associated processor circuit, automatically calculates the possible matching locations of the emitter with respect to the different locations, namely different hyperbolas. The hyperbolas are superimposed with each other in a mathematical manner, thereby obtaining intersection(s). The intersection of all hyperbolas obtained indicates the location of the emitter, e.g. the most reliable location.

Further, the first measurement results, the second measurement results and the third measurement results may be processed by time difference of arrival (TDoA) techniques in order to determine the location of the emitter. The respective techniques used are generally known, e.g. mathematical correlation procedures.

Further, the signal emitted may have at least one periodic signal portion, wherein the at least one periodic signal portion is processed when determining the location of the emitter. In some embodiments, the periodic signal portion can be used in order to ensure that the different measurement results obtained at different times and at different locations can be put in relation to each other.

As already mentioned above, the periodic signal portion also ensures that it can be assumed that all possible matching locations of the emitter have to lie on a hyperbola with respect to a respective location.

Further, a hyperbola may be determined based on the measurement results obtained at the respective location. The hyperbola defines all possible matching locations of the emitter. Hence, based on the respective location, it is assumed due to the periodic signal portion that the emitter is located on the respective hyperbola. Accordingly, the measurement results obtained can be processed such that they are transferred to a two-dimensional scenario, e.g. a map, wherein the respective hyperbola is calculated. The emitter should be located on the hyperbola.

Since several hyperbolas can be determined for each of the different locations at which the measurements are performed, at least three different hyperbolas are obtained that are superimposed with each other, thereby intersecting each other. Due to the three different hyperbolas, a location can be determined at which the emitter has to be located.

In case no signal is received at an intended location at which a respective measurement shall be performed, the receiver may move to a new location that is distanced to a previous measurement location by the same distance of the intended location, but in an orientation opposite to that used to reach the intended location. In other words, the new location at which the measurement will be performed is exactly opposite to the intended location at which no signal could be received with respect to the previous measurement location at which a measurement could be performed (immediately) previously.

For instance, no signal is received at the intended location for the second measurement, which causes the receiver to move from the intended location for the second measurement to the opposite direction by twice the distance between the first location and the intended location for the second measurement. Hence, the receiver arrives at a new location that is distanced from the first location by the same distance as the intended location for the second measurement, but exactly opposite.

A further aspect provides that the third location is determined, for example, such that the third location is maximally distanced from a hyperbola determined based on the first measurement results obtained at the first location and/or from a second hyperbola determined based on the second measurement results obtained at the second location. As discussed above, the respective hyperbola is obtained by transferring the measurement results to a two-dimensional scenario, e.g. a map. Thus, a maximum distance between the different locations can be obtained, thereby ensuring that the location of the emitter can be determined in a most precise manner.

For instance, the second location is distanced from the first location by a distance that corresponds to a fraction of the reception range, for example less than 50% of the reception range, preferably less than 30% of the reception range. This ensures that the signal can presumably still be received at the second location as the receiver should be enabled to receive a signal. When the receiver however does not receive a signal at the intended second location, the receiver is moved to a new location as discussed above in order to reach a new location at which the second measurement is performed. This new location becomes the second location.

The first location may be the location where the receiver receives the signal for the first time. Therefore, the first location is automatically determined due to the fact that the receiver receives a new signal for the first time.

Then, an automatic routine may be started to determine the location of the emitter of the respective signal received for the first time. The respective routine may include determining a (presumed) reception range and/or determining the second location at which the second measurement shall be performed.

The routine may also include moving the receiver to the second location to perform the second measurement. Further, the routine may include determining the third location by taking the (presumed) reception range and/or the hyperbola(s) determined into account.

Accordingly, the routine may dynamically determine the route that comprises the first location, the second location and the third location in order to perform three different measurements, thereby obtaining three different measurement results which can be processed in order to determine the location of the emitter in an appropriate manner.

In addition, measurements may be continuously performed when moving from the first location to the second location and/or when moving from the second location to the third location. Thus, measurement results are obtained in a continuous manner, thereby ensuring that measurement results are not only obtained at the discrete locations, namely the second location and the third location. Accordingly, the data basis used for determining the location of the emitter is enriched such that the location of the emitter can be determined in an accurate manner.

Furthermore, embodiments of the present disclosure also provide a locating system for time difference of arrival (TDoA) locating of an emitter that emits a signal. In an embodiment, the locating system comprises at least one movable receiver, wherein the locating system is configured to perform the method described above. The advantages and characteristics described above also apply to the locating system in an analogous manner.

The locating system may comprise a processor circuit that is used to determine the second location, the third location and/or the reception range based on which the second location and/or the third location is determined. The processor circuit may receive data from the receiver which is processed appropriately. Generally, the processor circuit may be part of the receiver or separately formed, but connected with the receiver so as to receive the data/information from the receiver for further processing.

In some embodiments, the at least one receiver is mounted on a platform, for instance an unmanned platform. However, the platform may also be a manned platform. As already mentioned, the receiver may be mounted on a platform that is land-based, sea-based or a flying platform. For instance, the receiver is part of an unmanned aerial vehicle (UAV) that is flying along the route in order to reach the different locations at which the respective measurements are performed, thereby obtaining the different measurement results based on which the location of the emitter can be determined.

Generally, the at least one periodic signal portion ensures that the measurement results obtained can be processed in order to calculate a hyperbola for the respective locations, for example each location at which a measurement is performed. The measurement results obtained are also processed for TDoA analysis, e.g. determining the time differences, based on which the hyperbolas are determined. The different hyperbolas are superimposed in order to identify an intersecting portion that indicates the location of the emitter.

In some embodiments, several steps of the method described, e.g. the processing of the measurement results obtained and, thus, determining the location of the emitter, relate to computer-implemented method steps, which are performed by the processor circuit.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
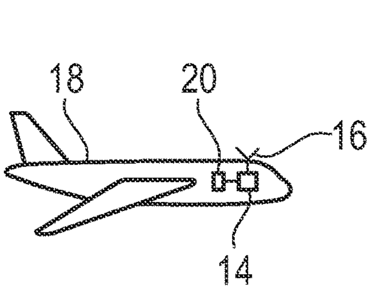
FIG. 1 schematically shows an example embodiment of a locating system according to the present disclosure, FIG. 2 schematically shows an overview illustrating a method of Time Difference of Arrival (TDoA) locating an emitter according to an embodiment of the present disclosure.
Figure 1:
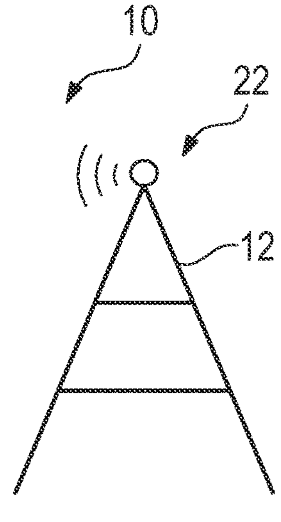

Turning now to FIG. 1, a locating system 10 is shown that is used for Time Difference of Arrival (TDoA) locating of an emitter 12 that emits at least one signal having a periodic signal portion. In some embodiments, the emitter 12 emits the signal continuously over-the-air. Accordingly, the signal emitted by the emitter 12 may be a radio signal.

In the embodiment shown, the locating system 10 comprises at least one movable receiver 14 that has an antenna 16 for receiving the signal, for example the radio signal. The receiver 14 is associated with a platform 18, namely a movable platform, for instance a vehicle, a ship, a plane or a drone. In the shown embodiment, the platform 18 is an unmanned aerial vehicle (UAV) that comprises the receiver 14.

The locating system 10 also includes a processor circuit 20 that may be part of the receiver 14 or associated with the receiver 14. The processor circuit 20 is configured to receive and process data, e.g. for performing calculations and/or analyses of the data. The circuit 20 may not necessarily be integrated in the receiver 14, but it may be part of the platform 18.

Figure 2:
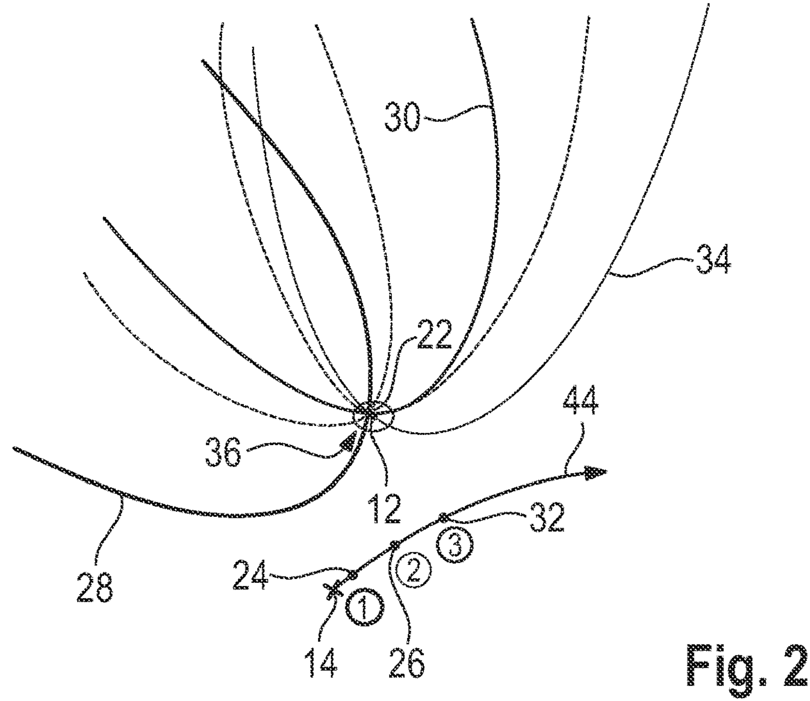

In FIG. 2, an overview is shown that illustrates the functionality of the locating system 10 of FIG. 1 based on which a method of Time Difference of Arrival (TDoA) locating will be explained in more detail, which can be done by the locating system 10.

The emitter 12 is located at an emitter location 22. The emitter 12 continuously emits the signal with the at least one periodic signal portion, for example the periodic signal, over-the-air. The receiver 14 receives the signal emitted at a first location 24 for the first time by its antenna 16, e.g. a first signal at a first time at the first location 24. While receiving the signal at the first location 24, first measurement results are obtained.

The (first) signal received is processed by the processor circuit 20, thereby obtaining information concerning the signal received. Based on the information obtained, a reception range of the emitter 12 is determined, for example a presumed reception range since the emitter 12 may be unknown. Hence, a presumed maximum reception range is determined which may be used to determine further locations at which measurements shall be done.

In some embodiments, the locating system 10 determines a second location 26 at which a second measurement shall be performed based on the (presumed) reception range determined, as the second location 26 shall be distanced to the first location 24 by a distance that corresponds to a fraction of the (presumed) reception range determined, for instance 25%.

Then, the receiver 14, for example the platform 18 having the receiver 14, is moved to the second location 26 so as to perform second measurements at the second location 26 (at a second time), thereby obtaining second measurement results.

The locating system 10 gathers the first measurement results at the first location 24 and the second measurement results at the second location 26. Based on these measurement results, the locating system 10, for example the processor circuit 20, is enabled to (roughly) determine a presumed location of the emitter 12.

In some embodiments, the measurement results obtained at the different locations 24, 26 are used to determine Time Differences of Arrival of the signal emitted by the emitter 12 by mathematical correlation procedures. The respective value determined and geographical coordinates of the locations 24, 26 provide the basis for the calculations of all possible matching locations of the emitter 12. In some embodiments, the data obtained is transferred to a two-dimensional scenario, e.g. a map, such that all possible matching locations of the emitter 12 lie on a hyperbola associated with the respective locations 24, 26 due to the periodic signal portion of the signal.

Accordingly, two different hyperbolas 28, 30 are obtained which are associated with the first location 24 and the second location 26, respectively. In other words, the respective hyperbolas 28, 30 are determined based on the measurement results obtained at the respective location. The hyperbolas 28, 30 define all possible matching locations of the emitter 12.

Once the hyperbolas 28, 30 are determined, the locating system 10, for example the processor circuit 20, determines a third location 32 at which a third measurement shall be performed. The third location 32 shall be maximally distanced from the hyperbolas 28, 30 determined. However, the (presumed) reception range of the emitter 12 is also taken into account to ensure that the third location 32 calculated is still located within the (presumed) reception range of the emitter 12.

The receiver 14 is moved to the third location 32 to perform third measurements of the signal emitted by the emitter 12 (at a third time), thereby obtaining third measurement results. The third measurement results are processed together with the first measurement results and/or the second measurement results in order to perform TDoA calculations which are used to determine a third hyperbola 34 associated with the third location 32.

When processing the third measurement results together with the first measurement results and/or the second measurement results, the first hyperbola 28 and/or the second hyperbola 30 may be updated, for example determined in a more precise manner. In some embodiments, additional data is taken into account which enhances the data base for the respective calculations.

Again, the data obtained is transferred to a two-dimensional scenario, e.g. a map, such that all possible matching locations of the emitter 12 lie on the third hyperbola 34 associated with the third location 32 due to the periodic signal portion of the signal.

Accordingly, three different hyperbolas 28, 30, 34 are obtained that each define all possible matching locations of the emitter 12 with respect to the respective locations 24, 26, 32. As shown in FIG. 2, the hyperbolas 28, 30, 34 intersect each other several times, but there is only one common intersection 36 of all hyperbolas 28, 30, 34. The common intersection 36 corresponds to the emitter location 22. Accordingly, the emitter location 22 can be determined based on TDoA measurement results.

Figure 3:
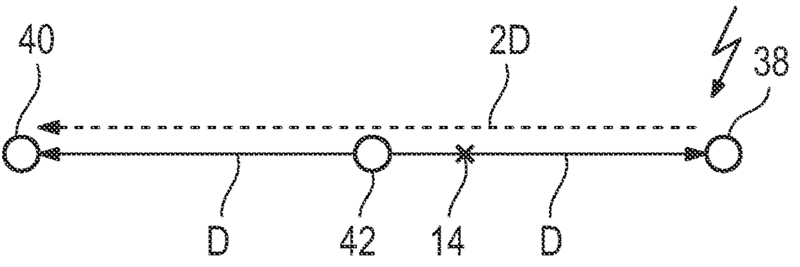
FIG. 3 shows a schematic overview how a new location for an intended measurement is found in case no signal is received at an intended location.

In FIG. 3, it is shown how the locating system 10 is acting in case no signal is received at an intended location 38 at which a measurement shall be performed, for instance at the intended second location or the intended third location. In some embodiments, the receiver 14 moves to a new location 40 at which the measurement will be performed. Generally, this might happen in case the presumed reception range does not correspond to the real reception range of the emitter 12 such that the receiver 14 was moved outside of the reception range at the intended location 38.

The new location 40 is distanced to a previous measurement location 42 at which a measurement was performed previously, e.g. the first location 24 or the second location 26, by the same distance D of the intended location 38, but in an orientation opposite to that used to reach the intended location 38. In other words, the receiver 14 will move twice the distance in the opposite direction to reach the new location 40 when starting from the intended location 38.

Generally, the locating system 10, for example the processor circuit 20, is enabled to dynamically determine a route 44 including the first location 24, the second location 26 and the third location 32. This may also be done in an automatic manner, e.g. without any manual input.

As mentioned above, the second location 26 is determined at the first location 24 based on the (presumed) reception range. The third location 32 is determined at the second location 26 based on the hyperbola(s) 28, 30 determined after having received the first and second measurement results. Hence, the route 44 is determined dynamically.

In addition, the measurements may be performed continuously rather than only performing discrete measurements at the different locations 24, 26, 32. Hence, the receiver 14 may perform the measurements while moving from the first location 24 to the second location 26 and/or while moving from the second location 26 to the third location 32.

Based on the additional measurement results obtained during the continuous measurements, several hyperbolas can be calculated that all rotate about the emitter location 22 as indicated in FIG. 2 by the additional hyperbolas illustrated by dashed lines. The emitter location 22 is the (real) location of the emitter 12. All hyperbolas intersect with each other in the common intersection 36 that coincidences with the emitter location 22.

As mentioned above, the platform 18 used to move the receiver 14 may be automatically driven such that the second location 26 and the third location 30 can be reached automatically. In other words, the receiver 14 moves to these locations 26, 30 automatically.

The locating system 10 is generally enabled to perform the steps of: performing the first measurement of the signal at the first location, 24 thereby obtaining the first measurement results, moving the receiver 14 to the second location 26, performing the second measurement of the signal at the second location 26, thereby obtaining the second measurement results, moving the receiver 14 to the third location 30, performing the third measurement of the signal at the third location 30, thereby obtaining the third measurement results, and processing the first measurement results, the second measurement results and the third measurement results, thereby determining the location of the emitter 12, namely the emitter location 22.

Moreover, the locating system 10 is configured to determine the second location 24 and/or the third location 26 (automatically) based on the reception range, e.g. the presumed reception range of the emitter 12. As indicated above, the presumed reception range of the emitter 12 may be determined based on the first measurement results.

Certain embodiments disclosed herein include components (e.g., the emitter 12, the receiver 14, the processor circuit 20, etc.) utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some embodiments, one or more of the components referenced above include circuitry programmed to carry out one or more steps of any of the methods disclosed herein. In some embodiments, one or more computer-readable media associated with or accessible by such circuitry contains computer readable instructions embodied thereon that, when executed by such circuitry, cause the component or circuitry to perform one or more steps of any of the methods disclosed herein.

In some embodiments, one or more of the components referenced above include circuitry programmed to carry out one or more steps of any of the methods disclosed herein. In some embodiments, one or more computer-readable media associated with or accessible by such circuitry contains computer readable instructions. These instructions may include, for example, applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

These program instructions, when executed by such associated circuitry, cause the component or circuitry to perform one or more steps of any of the methods disclosed herein. In that regard, the circuitry and/or memory storing the program instructions forms a special purpose machine or apparatus specifically configured to carry out the some of, or all of, the methodologies and technologies described in each block of any of the block diagrams and/or flowchart illustrations, or set forth in the claimed subject matter.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of Time Difference of Arrival locating an emitter that emits a signal by a mobile receiver, wherein the signal emitted by the emitter has at least one periodic signal portion, wherein the method comprises the steps of:
- performing a first measurement of the signal at a first location, thereby obtaining first measurement results;
- moving the receiver to a second location;
- performing a second measurement of the signal at the second location, thereby obtaining second measurement results;
- moving the receiver to a third location;
- performing a third measurement of the signal at the third location, thereby obtaining third measurement results, and
- processing the first measurement results, the second measurement results and the third measurement results, thereby determining the location of the emitter,
- wherein at least one of the second location and the third location is determined based on a reception range, and
- wherein the third location is determined such that the third location is maximally distanced from a hyperbola determined based on the first measurement results and the second measurement results obtained at the first location and the second location, respectively.

2. The method according to claim 1, wherein a route including the first location, the second location and the third location is dynamically determined.

3. The method according to claim 1, wherein a route including the first location, the second location and the third location is dynamically determined in an automatic manner.

4. The method according to claim 1, wherein the receiver automatically moves to the second location and/or to the third location.

5. The method according to claim 1, wherein the first measurement results, the second measurement results and the third measurement results are processed by Time Difference of Arrival techniques in order to determine the location of the emitter.

6. The method according to claim 1, wherein the reception range is a presumed maximum reception range.

7. The method according to claim 1, wherein the at least one periodic signal portion is processed when determining the location of the emitter.

8. The method according to claim 1, wherein a hyperbola is determined based on the measurement results obtained at two locations selected from the first location, the second location, and the third location.

9. The method according to claim 1, wherein, in case no signal is received at an intended location at which a measurement shall be performed, the receiver moves to a new location that is distanced to a previous measurement location by the same distance of the intended location, but in an orientation opposite to that used to reach the intended location.

10. The method according to claim 1, wherein the second location is distanced from the first location by a distance that corresponds to a fraction of the reception range.

11. The method according to claim 1, wherein the second location is distanced from the first location by a distance that corresponds to less than 50% of the reception range.

12. The method according to claim 1, wherein the second location is distanced from the first location by a distance that corresponds to less than 30% of the reception range.

13. The method according to claim 1, wherein the first location is the location where the receiver receives the signal emitted by the emitter for the first time.

14. The method according to claim 1, wherein measurements are continuously performed when moving from the first location to the second location and/or when moving from the second location to the third location.

15. A locating system for Time Difference of Arrival locating of an emitter that emits a signal having at least one periodic signal portion, wherein the locating system comprises at least one movable receiver and processor circuitry, wherein the locating system is configured to:

perform a first measurement of the signal at a first location, thereby obtaining first measurement results;

move the receiver to a second location;

perform a second measurement of the signal at the second location, thereby obtaining second measurement results;

move the receiver to a third location;

perform a third measurement of the signal at the third location, thereby obtaining third measurement results; and process the first measurement results, the second measurement results and the third measurement results, thereby determining the location of the emitter, wherein at least one of the second location and the third location is determined based on a reception range, and wherein the third location is determined such that the third location is maximally distanced from a hyperbola determined based on the first measurement results and the second measurement results obtained at the first location and the second location, respectively.

16. The locating system according to claim 15, wherein the processing circuit is used to determine the second location, the third location and/or the reception range based on which the second location and/or the third location is determined.

17. The locating system according to claim 15, wherein the at least one receiver is mounted on a movable platform.

18. The locating system according to claim 15, wherein the at least one receiver is mounted on an unmanned platform.

19. A method of Time Difference of Arrival locating an emitter that emits a signal by a mobile receiver, wherein the signal emitted by the emitter has at least one periodic signal portion, the method comprising:

performing a first measurement of the signal at a first location, thereby obtaining first measurement results;

moving the receiver to a second location;

performing a second measurement of the signal at the second location, thereby obtaining second measurement results;

moving the receiver to a third location;

performing a third measurement of the signal at the third location, thereby obtaining third measurement results, and processing the first measurement results, the second measurement results and the third measurement results, thereby determining the location of the emitter, wherein at least one of the second location and the third location is determined based on a reception range, wherein the third location is determined based on a hyperbola that is determined based on the first measurement results and the second measurement results obtained at the first location and the second location, respectively, and wherein the third location is determined based on the hyperbola by positioning the third location to provide an increased distance from the hyperbola.

* * * * *